United States Patent [19]

Oetjen et al.

[11] Patent Number: 4,486,054
[45] Date of Patent: Dec. 4, 1984

[54] RECIRCULATING ROLLING BEARING

[75] Inventors: Jürgen Oetjen, Herzogenaurach; Erich Lunz, Lonnerstadt, both of Fed. Rep. of Germany

[73] Assignee: INA Walzlager Schaeffler KG, Fed. Rep. of Germany

[21] Appl. No.: 518,293

[22] Filed: Jul. 28, 1983

[30] Foreign Application Priority Data

Aug. 2, 1982 [DE] Fed. Rep. of Germany ....... 3228762

[51] Int. Cl.³ .............................................. F16C 29/06
[52] U.S. Cl. .................................................. 308/6 C
[58] Field of Search ...................... 308/6 C, 6 R, 6 A; 464/168

[56] References Cited

U.S. PATENT DOCUMENTS

| | | | |
|---|---|---|---|
| 3,887,245 | 6/1975 | McCloskey | 308/6 C |
| 3,915,513 | 10/1975 | Mayer | 308/6 C |
| 4,005,913 | 2/1977 | Thomson | 308/6 C |
| 4,231,621 | 11/1980 | Teramachi | 308/6 C |

*Primary Examiner*—Lenard A. Footland
*Attorney, Agent, or Firm*—Charles A. Muserlian

[57] ABSTRACT

Novel recirculating rolling bearings for the longitudinally moveable mounting of an element with a linear surface comprising a bearing body having two opposite straight race sections limited by lateral flanges connected by two curved end deflecting sections connecting the ends of the straight sections to form a closed raceway and rolling bodies in said closed raceway rotating about an axis, the bearing body having a cylindrical outer contour and is insertable into a corresponding cylindrical bore of a housing which bore is open toward the element to be supported in the area of one straight race section opposite said element, the common axis of the bearing body and the housing bore having a slight inclination relative to the straight race section opposite the element to be supported.

4 Claims, 4 Drawing Figures

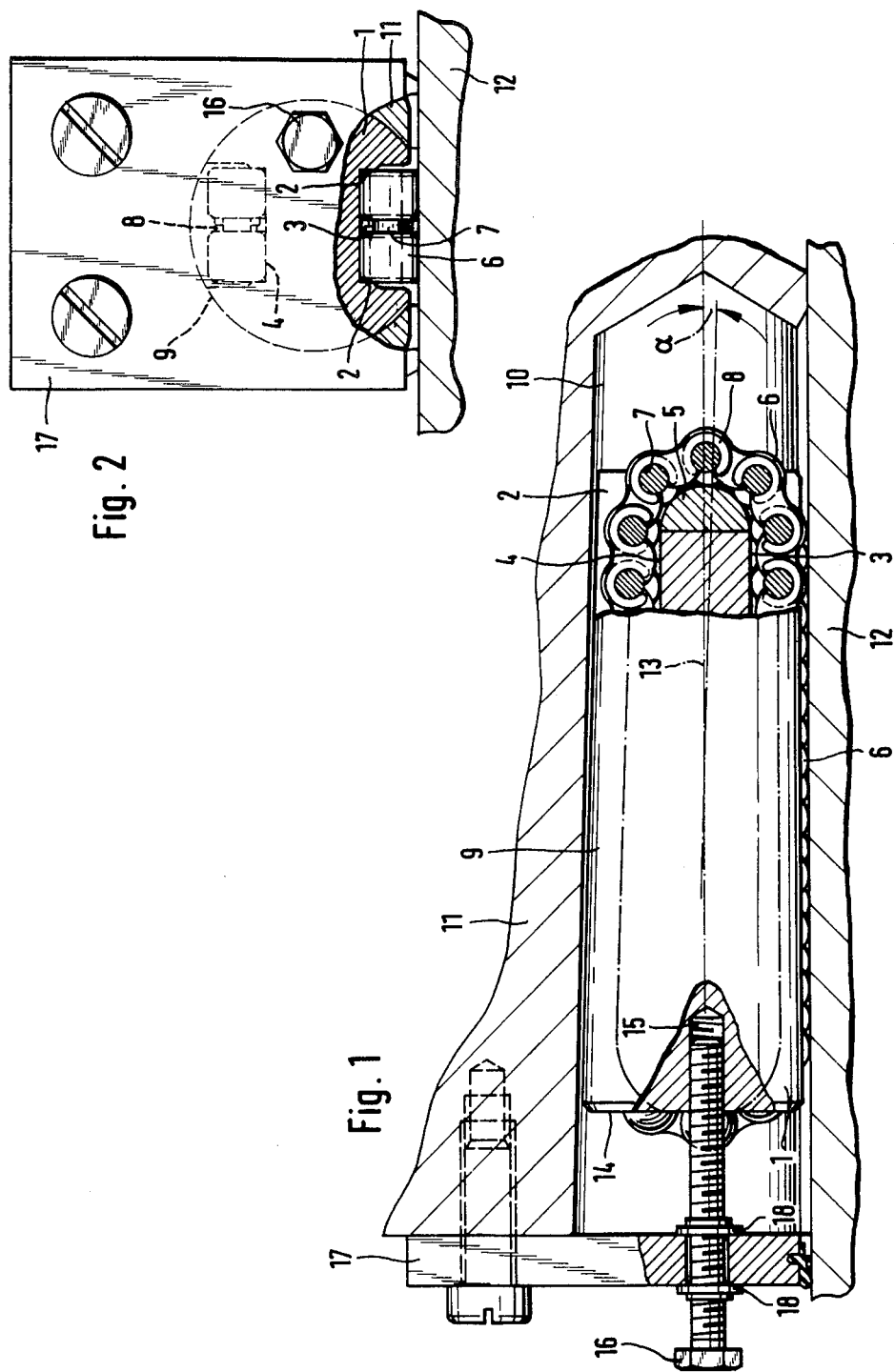

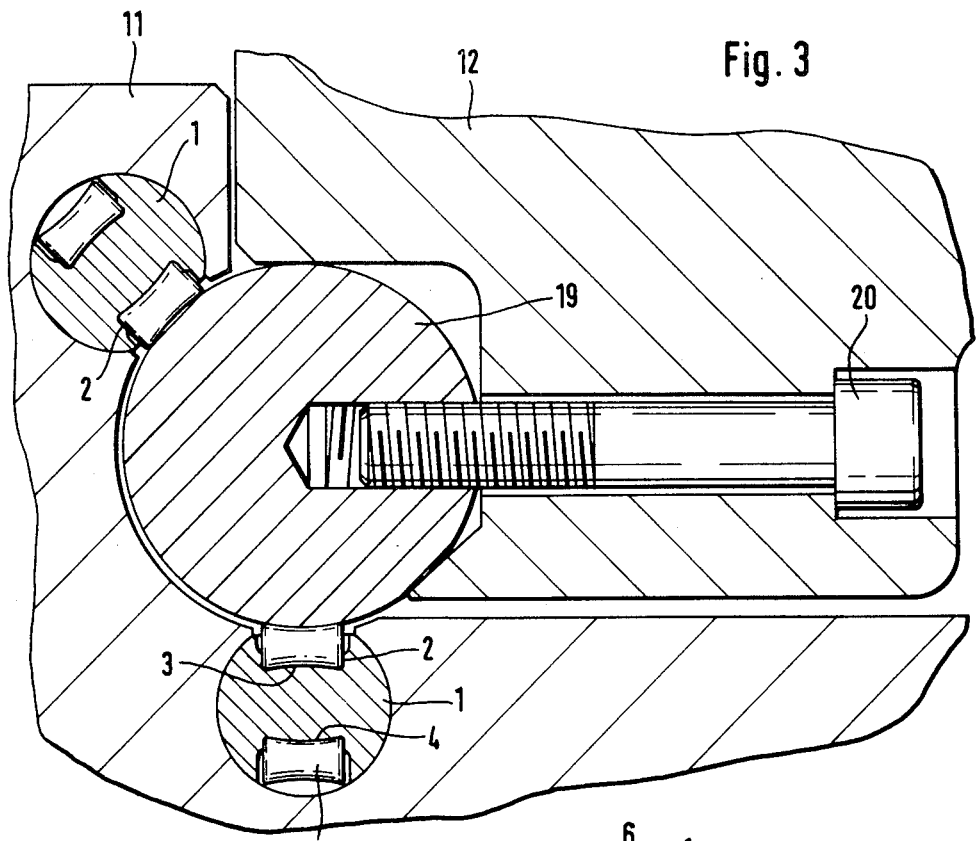
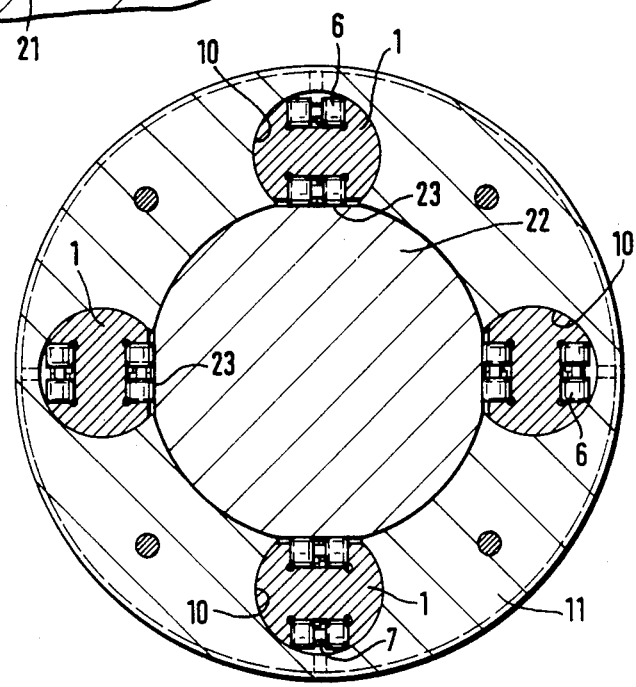

RECIRCULATING ROLLING BEARING

STATE OF THE ART

Recirculating roller bearings are used for the support of machine parts which cover long linear displacement paths with reversal of the direction of motion as is the case, for example, in tool tables for grinding machines. Such bearings are usually assembled with prestress to ensure smooth operation of the bearings to achieve lack of play and increased stiffness when under load.

These objects are obtained in known roller bearings such as Swiss patent No. 446,823 by providing wedges between the bearing body and the counter-surface serving for attachment whereby exact adjustment of the prestress is possible. The use of these additional structural elements not only complicates the assembly of the bearing but also increases its costs and increases the overall height of the roller bearing in an undesirable manner. Moreover, the plurality of separate elements adversely affects the desired stiffness of the rolling bearing.

OBJECTS OF THE INVENTION

It is an object of the invention to provide an improved recirculating rolling bearing free of the prior art disadvantages and capable of being mounted with prestress without additional elements or any increase in overall height.

This and other objects and advantages of the invention will become obvious from the following detailed description.

THE INVENTION

The novel recirculating rolling bearing of the invention for the longitudinally moveable mounting of an element with a linear surface comprises a bearing body having two opposite straight race sections limited by lateral flanges connected by two curved end deflecting sections connecting the ends of the straight sections to form a closed raceway and rolling bodies in said closed raceway rotating about an axis, the bearing body having a cylindrical outer contour and is insertable into a corresponding cylindrical bore of a housing which bore is open toward the element to be supported in the area of one straight race section opposite said element, the common axis of the bearing body and the housing bore having a slight inclination relative to the straight race section opposite the element to be supported. Preferably, the inclination is less than 1:12.

The bearing of the invention can be prestressed or adjusted without play by simple longitudinal displacement without the use of any separate structural elements and the elimination of separate wedges substantially increases the stiffness of the roller bearing. The novel outer contour of the bearing body has the further advantages in the reduced volume as compared with known height adjustable roller bearings and in being self-aligning under load whereby end pressures are substantially avoided.

In a modification of the bearing of the invention, the rolling bearing is provided with means for longitudinal displacement and fixation in the housing bore whereby the adjusting process is greatly facilitated and setup time is considerably reduced.

Referring now to the drawings:

FIG. 1 is a partial longitudinal cross-section view of one embodiment of a rolling bearing of the invention and FIG. 2 is a partial cross-sectional end view of the same bearing.

FIG. 3 is a fragmented transverse sectional view of a second embodiment of a rolling bearing of the invention and FIG. 4 is a transverse cross sectional view of a third embodiment of a rolling bearing of the invention.

The roller bearing of FIGS. 1 and 2 consists of bearing body 1 having two opposite straight race sections 3 and 4 limited by lateral flanges 2 and connected by two curved guide sections 5 to form a closed race for cylindrical rollers 6 which are provided with a central cutout 7 engaging retention means 8. The outer contour 9 of the bearing body 1 is cylindrical and the body 1 is inserted into a corresponding cylindrical bore 10 of housing 11. Bore 10 is open toward the structural element 12 to be supported in the area of straight race section 3 opposite element 12 and the common axis 13 of bearing body 1 and bore 10 of housing 11 has a slight inclination relative to straight race section 3 opposite element 12 indicated as angle α.

For longitudinal displacement of the roller bearing, a threaded bore 15 cooperating with screen 16 is provided at the end face 14 of body 1 and screen 16 is rotatably disposed in plate 17 which is secured to housing 11. Screen 16 is fixed on plate 17 by lock rings 18 on both sides to allow longitudinal displacement in both directions.

In the embodiment of FIG. 3, housing 11 contains two roller bearings of a design similar to the embodiment of FIGS. 1 and 2 and the race of element 12 to be supported is formed by rod 19 with a round cross-section connected to element 12 by screws 20. Cylindrical rollers 21 are provided with a concave rolling surface adapted to the outer contour of rod 19.

In the roller bearing embodiment of FIG. 4, rod 22 provided with flattened races 23 is received in a housing 11 containing four bores 10 for accommodating roller bearings of the invention. Bores 10 and bearing bodies 1 of the roller bearings are designed according to FIGS. 1 and 2 and are provided with means (not shown) for longitudinal displacement.

Various modifications of the bearing of the invention may be made without departing from the spirit or scope thereof and it is to be understood that the invention is intended to be limited only as defined in the appended claims.

What we claim is:

1. A recirculating rolling bearing for the longitudinally moveable mounting of an element with a linear surface comprising a bearing body having two opposite straight race sections limited by lateral flanges connected by two curved end deflecting sections connecting the ends of the straight sections to form a closed raceway and rolling bodies in said closed raceway rotating about an axis, the bearing body having a cylindrical outer contour and is insertable into a corresponding cylindrical bore of a housing which bore is open toward the element to be supported in the area of one straight race section opposite said element, the common axis of the bearing body and the housing bore having a slight inclination relative to the straight race section opposite the element to be supported.

2. A bearing of claim 1 wherein the inclination is less than 1:12.

3. A bearing of claim 1 provided with means for longitudinal displacement and fixation in the housing bore.

4. A bearing of claim 2 provided with means for longitudinal displacement and fixation in the housing bore.

* * * * *